United States Patent
Mason

(10) Patent No.: US 7,125,531 B1
(45) Date of Patent: Oct. 24, 2006

(54) SINGLE STAGE DENITRATION

(75) Inventor: J. Bradley Mason, Pasco, WA (US)

(73) Assignee: Studsvik, Inc., Erwin, TN (US)

( * ) Notice: Subject to any disclaimer, the term of this patent is extended or adjusted under 35 U.S.C. 154(b) by 235 days.

(21) Appl. No.: 10/111,148

(22) PCT Filed: Oct. 19, 2000

(86) PCT No.: PCT/US00/41323

§ 371 (c)(1),
(2), (4) Date: Apr. 19, 2002

(87) PCT Pub. No.: WO01/45832

PCT Pub. Date: Jun. 28, 2001

Related U.S. Application Data

(63) Continuation-in-part of application No. 09/421,612, filed on Oct. 20, 1999, now Pat. No. 6,280,694.

(51) Int. Cl.
*B01D 53/56* (2006.01)
(52) U.S. Cl. .................... 423/239.1; 423/235
(58) Field of Classification Search ........... 423/235, 423/239.1
See application file for complete search history.

(56) References Cited

U.S. PATENT DOCUMENTS

| | | | |
|---|---|---|---|
| 3,907,674 A | 9/1975 | Roberts et al. | |
| 4,154,643 A | 5/1979 | Cook et al. | |
| 4,218,427 A | 8/1980 | Yan | |
| 4,224,289 A | 9/1980 | Covey et al. | |
| 4,226,830 A | 10/1980 | Davis | |
| 4,448,589 A | 5/1984 | Fan et al. | |
| 4,483,692 A | 11/1984 | Patel | |
| 4,609,537 A | 9/1986 | Tolpin et al. | |
| 4,656,147 A | 4/1987 | Iida et al. | |
| 4,662,081 A | 5/1987 | Greenwood | |
| 4,664,678 A | 5/1987 | Rehmat et al. | |
| 4,665,632 A | 5/1987 | Greenwood | |
| 4,668,435 A | 5/1987 | Grantham | |
| 4,692,318 A * | 9/1987 | Tolpin et al. | 423/239.1 |
| 4,966,101 A | 10/1990 | Maeda et al. | |
| 4,982,027 A | 1/1991 | Korff et al. | |
| 4,993,323 A | 2/1991 | Tabery et al. | |
| 5,084,258 A | 1/1992 | Linn | |
| 5,224,334 A * | 7/1993 | Bell | 60/274 |
| 5,378,443 A * | 1/1995 | Engstrom et al. | 423/239.1 |
| 5,518,702 A * | 5/1996 | Perry | 423/239.1 |
| 5,536,896 A | 7/1996 | Hesbol et al. | |
| 5,707,592 A | 1/1998 | Someus | |
| 5,909,654 A | 6/1999 | Hesbol | |
| 6,084,147 A | 7/2000 | Mason | |
| 6,211,254 B1 | 4/2001 | Whitney | |
| 6,280,694 B1 | 8/2001 | Mason | |
| 6,281,164 B1 | 8/2001 | Demmel et al. | |
| 2003/0198584 A1 | 10/2003 | Mason | |
| 2005/0096495 A1 | 5/2005 | Mason | |

FOREIGN PATENT DOCUMENTS

| | | |
|---|---|---|
| EP | 0471278 | 2/1992 |
| GB | 2271517 | 4/1994 |
| RU | 2216396 | 11/2003 |
| ZA | 200203941 | 1/2003 |

OTHER PUBLICATIONS

Copy of webpage—Alternative High-Level Waste Treatments at the Idaho National Engineering & Environmental Laboratory; ;http://books.nap.edu/books/030906628X/html/56.html; 2 pages ; dated Sep. 25, 2004.
Copy of Webpage Alternative High-Level Waste Treatments at the Idaho National Engineering And Environmental Laboratory; http://books.nap.edu/books/030906628X/html/56.html/56.html; 2 pages dated Sep. 25, 2004.
Cementitious Solidification of DOE's Legacy Reprocessing Waste by Darryl D. Siemer of Idaho national Engineering and Environmental Laboratory, no date.
Scott Jeffers, John F. Mullen, Austin J. Cohen and Ky Dangtran; "Control Problem Waste Feeds in Fluid Beds" May 1999, 5 pages.
Clarence J. Wall, John T. Graves and Elliott J. Roberts "How to Burn Salty Sludges" from Apr. 14, 1975. 6 pages.
Joseph A. Nenni, Richard D. Boardman "Thermal Denitration and Mineralization of Waste Constituents" 14 pages, no date.

* cited by examiner

*Primary Examiner*—Edward M. Johnson
(74) *Attorney, Agent, or Firm*—Townsend M. Belser, Jr.; Nexsen Pruet Adams Kleemeier, LLC

(57) ABSTRACT

A system and method is described having a single reaction vessel (12) using superheated stream optionally augmented by oxygen for reducing nitrogen oxides present in a wide variety of organic compounds. Reduction takes place quickly when a stream/oxygen mixture is injected into a fluidized bed (22) of ceramic beads. Reducing additives are metered into the reaction vessel (12) and/or provide energy input to reduce nitrates to nitrogen. The speed of the fluidizing gas mixture agitates the beads that then help to break up solid wastes and to allow self-cleaning through abrasion thereby eliminating agglomerates, and the oxygen, when used, allows for some oxidation of waste by-products and provides an additional offset for thermal requirements of operation.

105 Claims, 1 Drawing Sheet

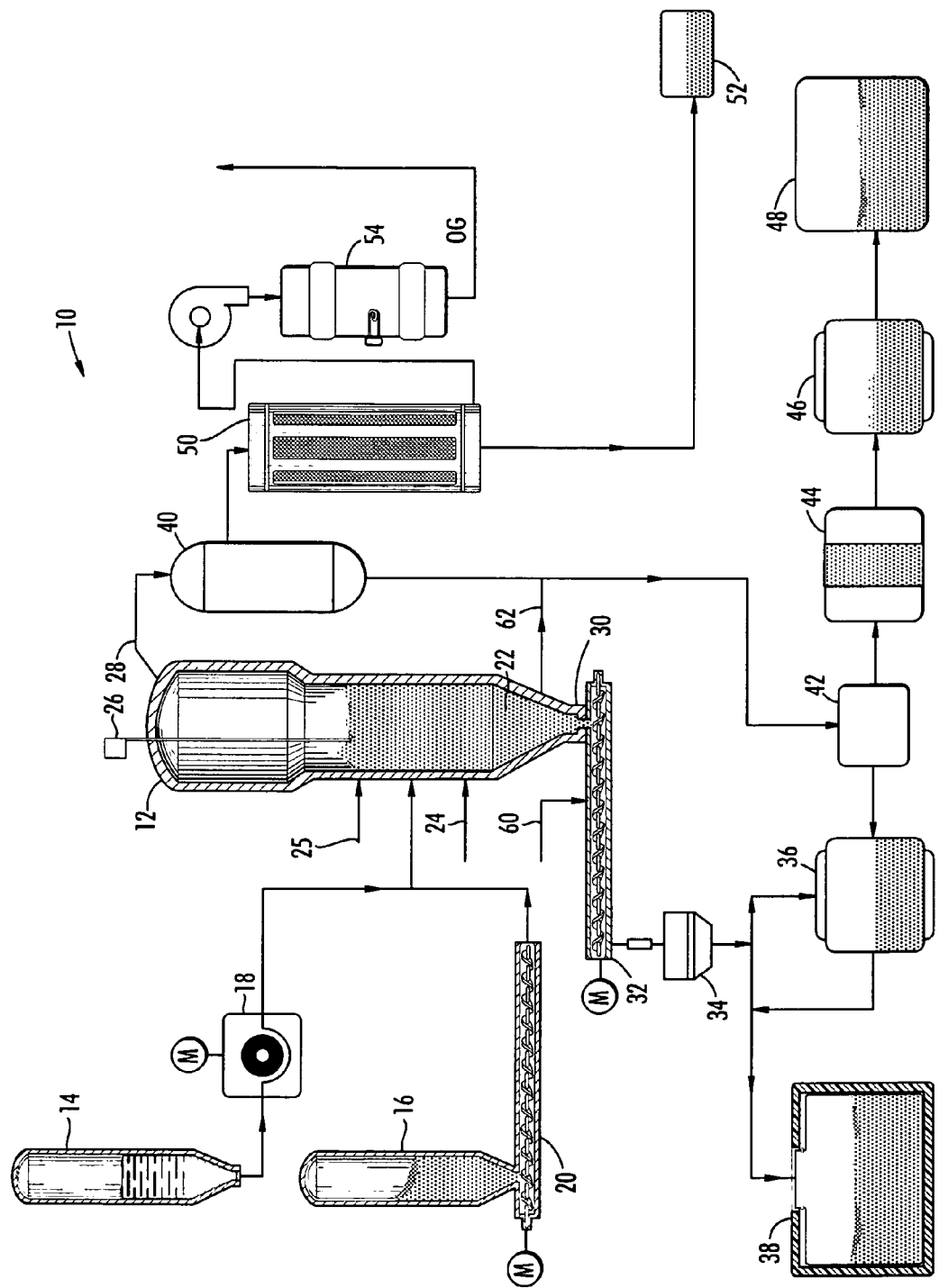

SINGLE STAGE DENITRATION

This application is a continuation-in-part application to U.S. patent application Ser. No. 09/421,612 filed Oct. 20, 1999 now U.S. Pat. No. 6,280,694.

FIELD OF THE INVENTION

The present invention relates generally to a single step process for removing NOx compounds from waste products, compounds and wastewaters. More specifically, the invention relates to a single step process utilizing a fluidized bed container to remove NOx compounds from explosive, hazardous and/or radioactive materials.

BACKGROUND OF THE INVENTION

Nitrogen oxides can be commonly found in many waste products and compounds. Nitrogen oxides (referred to herein as "NOx") include such compounds as nitric acid, aluminum nitrate, sodium nitrate, ammonium nitrate, potassium nitrate and the like.

Traditional approaches to removing NOx include dry contact reduction processes for solid and gaseous nitrate compounds and wet absorption processes for gaseous NOx. Dry contact reduction processes may be either catalytic or non-catalytic and may be either selective or non-selective. Selective reduction processes are characterized by the selective reduction of gaseous nitrogen oxides and their consequent removal in the presence of oxygen. A common selective reduction agent for gaseous NOx is ammonia. Ammonia, however, oxidizes to form unwanted nitrogen oxide at high temperatures. Moreover, excess ammonia is itself a pollutant. Other selective reduction methods employ catalysts such as iridium. The problem with catalyst reduction is that the presence of particulates, sulfurous acid gases and other poisons reduce catalyst effectiveness and life thereby increasing costs.

Non-selective reduction processes generally involve the addition of a reducing agent to the gaseous NOx containing material, consuming all free oxygen through combustion and reducing the NOx to nitrogen by the remaining reducing agent. Catalysts are typically utilized in these processes. Reducing agents useful in these processes are both scarce and expensive.

Wet absorption processes typically require large and expensive equipment such as absorption towers. An example of a wet absorption process is the absorption of nitrogen oxides by water or alkali solution. Another shortcoming of the wet absorption process is that these methods are not economically effective where the NOx concentration in the gaseous waste stream is about 5,000 ppm.

In the nuclear industry, there is an annual production of significant amounts of wastes which are classified as radioactively contaminated salt cakes, ion exchange media, sludges and solvents. These radioactive wastes either contain nitrogen oxides or nitrogen oxides are produced as part of the treatment of these wastes. In particular, nuclear fuel reprocessing with nitric acid produces highly radioactive nitric acid and sodium nitrate waste by-products.

For solid or slurry NOx wastes and compounds a variety of processes have been tried for NOx destruction. Rotary calciner and fluid bed processors have been utilized with typical results yielding less than 90% conversion of solid nitrates to gaseous NOx and nitrogen. The gaseous NOx generally exceeded 10,000 ppm which requires addition of extensive gaseous NOx removal methods as described above. In addition, severe agglomerations occur in processors as well as the presence of flammable or explosive mixtures of nitrates and reducing agents in the processors.

Another problem associated with prior art waste processing methods involves sulfur-containing compounds. The presence of such sulfur compounds in a vitrification melter can cause a molten sulfur salt pool to accumulate on top of the molten inorganic residue (glass); this pool causes high corrosion rates for the melter equipment. The pool can also have a high electrical conductivity, which causes short-circuiting of the heating electrodes in the melter. Additionally, potentially explosive conditions can result if large quantities of water contact the molten sulfur salt pool.

Further, the presence of heavy metals in the inorganic residues can render the final waste product hazardous, thereby requiring additional processing of the residue before disposal or higher disposal costs. Also, the inorganic residue can contain soluble components that may form aqueous solutions after processing; these solutions can result in contamination of the surroundings after disposal.

A process which does not have the limitations and shortcomings of the above described prior art methods for nitrogen oxide removal from waste streams and compounds would be highly desirable.

SUMMARY OF THE INVENTION

According to its major aspects and briefly recited, the present invention is a method and apparatus for converting nitrogen oxides directly to nitrogen using a single steam-reformer vessel. Nitrate compounds or wastes are fed into the single vessel along with a fluidized gas composed of steam and, optionally, oxygen. The single vessel contains an inert media bed made of high-density media, such as amorphous alumina beads up to 3000 microns in diameter. The fluidizing gases are injected at relatively high speeds, ranging up to 800 feet per second.

In a first embodiment of the present invention, carbonaceous materials are used as the heat source to evaporate water in the waste feed and as the principal reducing agent, or reductant. The terms reducing agent and reductant are well-understood by those skilled in the art of removing nitrogen oxides from waste feeds to mean chemicals or materials that are useful in removing oxygen from a compound or adding hydrogen to a compound.

The vessel is divided into three zones with the lowest most zone operated under oxidizing conditions via the addition of superheated steam with oxygen that reacts with the carbon to form $CO/CO_2$ and generate heat to evaporate water content and heat nitrate compounds to reduction temperature. The middle zone is operated under strongly reducing conditions in which $NO_3$, $NO$, $N_2O$ and $NO_2$ are reduced to $N_2$. Steam reforming of carbonaceous materials in this zone forms $CO$, $H_2$ and $CH_4$ that serve as strong gaseous reducing agents. The upper zone is operated under oxidizing conditions via the addition of more oxygen that oxidizes the remaining $C$, $CO$, $CH_4$ and $H_2$ form in the second or middle zone to form $CO_2$ and water. This process result in only trace NOx, $CO$ and $H_2$ in off-gas from the single vessel and requires little auxiliary energy to be added.

In a second embodiment of the present invention, the lowest zone is operated under oxidizing conditions and the middle and upper segments operated under strongly reducing conditions. This process results in less NOx, more CO and $H_2$ output and also requires low auxiliary energy. Auxiliary energy can be provided by electrical heaters.

In a third embodiment of the present invention, all three segments are operated under strongly reducing conditions. This process results in less NOx, increased CO and $H_2$ and requires additional auxiliary energy.

In a fourth embodiment of the present invention, the lower and middle segments are operated under strongly reducing conditions and the upper segment is operated under oxidizing conditions. This process results in low NOx, no CO and $H_2$ output but requires auxiliary energy to be added.

BRIEF DESCRIPTION OF THE DRAWINGS

In the drawings,

The FIGURE is a schematic illustration of a system for removing NOx from a waste stream or compound according to a preferred embodiment of the present invention.

DETAILED DESCRIPTION OF PREFERRED EMBODIMENTS

The present invention is an apparatus and process for removing NOx from nitrate bearing compounds and waste product feeds. As used herein, "NOx" can include any material having nitrogen oxide groups. The present apparatus and processes will be described in particular with respect to radioactive waste but any nitrogen oxide containing waste or product stream can be processed in accordance with the following process and with the components of the system.

The process is based on a single fluidized bed reactor vessel using steam for fluidizing which may be operated under strongly reducing conditions or under strongly reducing conditions in combination with oxidizing conditions. Other fluidizing gases or additives may be utilized to modify the oxidizing or reducing conditions in the reactor. Typical other fluidizing gases include: hydrogen, oxygen (when oxidizing conditions are desired), methane, ammonia, etc. Other additives can be added such as charcoal, carbonaceous materials, sugars, hydrogen peroxide, etc. to further modify reducing or oxidizing conditions in the bed. Wet scrubbers are used to treat gaseous effluent from the process. The wastes that can be processed according to the present invention include not only NOx containing waste streams resulting from the decomposition of ion exchange resins, but also NOx containing waste stream resulting from nuclear reprocessing, explosives and energetics, fertilizer and gaseous off-gas streams and the like.

Referring now to the FIGURE, there is shown a system according to the present invention and generally indicated by reference number 10. System 10 includes a single reactor vessel 12. Waste feed, which may be comprised of liquid slurries and sludges 14 and/or solids 16, are fed into the reactor vessel 12. In the case of the liquid slurries and sludges 14, a pneumatic pump, peristaltic pump or progressive cavity 18 may be employed for delivery of the pumpable fluids to the reactor vessel 12. In the case of the solids 16, a screw auger 20 may be employed to deliver the solid waste stream into the reactor vessel 12.

In reactor vessel 12, inert media 22 is used in the fluid bed. Media 22 is preferably an inert material which may serve as a heat sink such as silica or alumina, most preferably, amorphous alumina beads at least 200 and preferably up to 1000 microns in diameter, however beads up to 5,000 microns in diameter can be utilized. Such size beads do not easily elutriate out of the vessel and therefore minimize carryover. Another advantage of the amorphous alumina is that it will not form eutectic salt/glasses that can form harmful agglomerates that affect reactor efficiency as when common silica sand is utilized. The amorphous alumina is also exceptionally strong and hard and resists attrition due to bed friction and impact.

In order to evaporate water present in the waste feeds and to serve as a heat source, charcoal, sugar and/or other carbonaceous materials are added to reactor vessel 12, optionally other reductants or catalysts such as iron or nickel oxalates, oxides, or nitrates may be used. Reaction bed materials can be modified to include these, or other metals, in order to further improve the denitration process. For example, the addition of 5 to 10% iron oxide to the reaction bed medium can improve NOx reduction by more than two-fold. Fluidizing medium (gases) is introduced into reaction vessel 12 via inlet 24. Steam is preferred to combustion gases as the fluidizing medium because it is more reactive, and generates CO and $H_2$ that are highly reducing by steam reformation of carbonaceous materials. Gaseous NOx compounds can be co-injected with the fluidizing gases through inlet 24.

The heat generated by the steam allows the reaction vessel to be operated at the temperature required for reduction of the nitrogen oxides. This heat can also volatize sulfur-containing compounds, thereby separating them from the inorganic residues. As discussed above, the presence of such sulfur compounds can cause an equipment-damaging corrosive molten sulfur salt pool to accumulate on top of the molten inorganic residue. The electrically-conductive pool would also cause short-circuiting of the heating electrodes or potentially explosive conditions if contacted by large quantities of water. The present method, for example, converts sulfates such as $Na_2SO_4$ by reduction into volatile SOx and/or $H_2S$. By volatizing such sulfur-containing compounds, the present method avoids these problems that are traditionally associated with the reduction of nitrogen oxide-containing waste streams. The sulfur reduced residue can then be melted into glass without forming a sulfur salt pool on top of the melter glass pool.

The fluidizing medium can be an inert gas, but is preferably a reforming gas and may have oxygen present. Most preferably, the medium is superheated steam. The fluidizing velocity can range from about 1.0 feet per second or higher depending on the bed media, preferably 3 to 10 feet per second (FPS) depending upon the size of the bed media. Fluidizing gas distributors are designed to provide higher than normal gas/orifice velocities. Typical gas distributor velocities are 100 to 200 FPS, however, in the preferred embodiment gas velocities of >400 FPS are desired.

The high fluidizing gas jet speed has several advantages. High velocity fluidizing gas jets in a vertically oriented bed provides jet impingement on the media to help break down the softer, friable feed and to break-up agglomerates. Moreover, the media beads become self-cleaning due to abrasion in the high impact area around the fluidizing gas distributor.

Reactor vessel 12 is preferably operated in elutriating mode. Sodium and other low melting eutectics are thereby present in only low concentration (<2%) and are quickly carried out of the bed. The media beads are self-cleaning through abrasion. The low inventory of unconverted nitrates or sodium compounds greatly minimizes agglomeration potential.

As discussed above, the reactor vessel 12 may be operated using one of four methods, in the first method, the lower portion of the media bed is operated under oxidizing conditions. To achieve this condition oxygen is mixed with the steam and introduced into the reactor vessel 12 via inlet 24 and may be optionally superheated. The pressure in the reactor vessel 12 is preferably about 13 to 15 psia. The reactor vessel 12 is preferably operated at 600 to 800 degrees centigrade. The media bed depth is preferably between about 3 to 8 feet, expanded. The middle portion of media bed in reactor vessel 12 is operated under strongly reducing conditions, and the upper portion of the media bed is operated under oxidizing conditions by the addition of oxygen via inlet 25. Temperature is maintained within reactor vessel 12 by heater 26 or by super heating fluidizing gases which provides auxiliary energy as needed, particularly during start-up. When the NOx has been reduced to nitrogen, the nitrogen, steam and other syn gases leave the reaction vessel 12 via port 28. Small sized reformed residues, including entrained particulates also leave via port 28. Heavier solids and debris leave via port 30 and are carried away by screw auger 32 to collector 34. Auger 32 is preferably water cooled. From collector 34 the larger solids and debris may be directed to stabilization processor 36 or to final reformed residue waste collector 38.

The screw auger 32 can be optionally fitted with water washing capability. Water can be introduced into the bottom of screw auger 32 through inlet 60. Water dissolves any soluble sodium salt or other agglomerates that collect in the bottom of the reactor vessel 12. Salt water solution is removed from the bottom of reactor vessel 12 through screened outlet port 62. If desired, the salt water solution from outlet 62 can be collected in residue separator 42.

The nitrogen gas, steam, other syn gas and fine particulates pass through scrubber/evaporator 40. Any non-gaseous reformed residue or particulates collected in the scrubber/evaporator 40 is directed to residue separator 42 wherein the insoluble reformed residue are separated from the soluble salt solution. The reformed residue is directed to the stabilization processor 36 while the salt solution is directed to salt separator 44 then to a salt dryer 46 and finally to a salt package 48. An optional filter (not shown) can be installed between the reactor gas outlet 28 and the scrubber/evaporator 40. Solids collected by the optional filter can be directed to residue stabilization processor 36. The cooled and scrubbed syn gas and water vapors then pass to condenser 50. The resultant water is directed to the recycled water tank 52 while the syn gas moves to thermal converter 54. Off-gases (OG) from the thermal converter 54 are then monitored for compliance with the applicable environmental requirements prior to release.

Under the conditions of method 1 set forth above, the process treatment results in final gaseous effluent very low in NOx with no CO and $H_2$ output. The system generally requires low auxiliary energy addition. This system does not require the removal of NOx in the off gas scrubber system as NOx levels exiting the reactor 12 are routinely <25 ppm. The addition of thermal converter 54 for CO and $CH_4$ oxidation is also not required.

Alternatively and in a second method of the invention, the lower portion of the media bed in reactor vessel 12 may be operated under oxidizing conditions, as discussed above, the middle portion and the upper portions of the media bed are operated under strongly reducing conditions. Method 2 results in lowered NOx exiting reactor 12 as compared to method 1 but has increased levels of CO and $H_2$ and other trace volatile organics in the reactor 12 output. Additional auxiliary energy is generally needed in the reactor 12 and thermal converter 54 is required.

In method 3, the reactor vessel 12 is operated only under strongly reducing conditions. Method 3 results in lowered NOx, increased CO and $H_2$ and requires increased auxiliary energy and use of thermal converter 54.

In method 4, only the upper portion of the reactor vessel 12 media bed is operated under oxidizing conditions. Method 4 results in low NOx, no CO and $H_2$ output and increased auxiliary energy. The thermal converter 54 is not required in the practice of this method.

Notably, gaseous NOx can also be processed by direct introduction to reactor 12 with other waste feeds. For example, high NOx offgas from a vitrification melter or thermal denitration process can be used as both the waste stream and the fluidizing gas; however, steam is co-injected to keep the total gas flow through the reaction bed at greater than 20% steam and to provide uniform fluidizing gas velocities.

Testing has demonstrated the usefulness of metal additions to the bed to facilitate NOx conversion to nitrogen gas. Typical metals that can be used include copper, cobalt, iron or nickel oxalate or nitrates that can be co-injected with the waste feed in concentrations of less than 0.5%.

The addition of charcoal or carbonaceous solids to the bed in sizes ranging up to 0.5 inches in diameter is unique to the preferred embodiment. The large particles of carbon maintain a constant inventory of carbon that is not possible with typical fine sugars, organic powders or liquid chemicals previously used to facilitate nitrate reduction. The presence of larger carbon solids together with addition of soluble carbon in the form of formic acid, sugars, etc. provides superior nitrate reductions. The presence of carbon compounds in the bed will produce highly reducing CO and $H_2$ in the bed via steam reformation.

Additionally, certain additives such as aluminum metal and phosphate salts or oxides can be added to form high melting point salts with alkaline earth elements. For example, sodium phosphate is a high melting point sodium salt compared with sodium eutectics that have relatively low temperature melting points. These combining elements help minimize formations of agglomerations in the bed.

In the present method, heavy metals or inorganic cations can be converted into volatile fluoride or chloride compounds by the addition of appropriate fluorides and chlorides. As discussed above, the presence of heavy metals in the inorganic residues can render the final waste product hazardous, thereby requiring additional processing of the residue before disposal. For example, in a waste product that contains the relatively non-volatile CsO, chloride additives can convert the Cesium to very volatile $CsCl_2$, thereby separating the heavy metal cation from the inorganic residue. By converting such hazardous metals or cations to the corresponding fluorides or chlorides and removing them from the inorganic residues by volatization, the present method avoids this problem that is traditionally associated with the reduction of nitrogen oxide-containing waste streams.

Further, the present method can use additives to tailor the solubility of the resulting inorganic residue. As discussed above, soluble components in the residue may form aqueous solutions that can result in contamination of the surroundings after disposal. An example of such tailoring of the solubility of the residue in the present method is the addition of aluminum nitrate to sodium-containing waste; in the correct proportions, this additive produces sodium-aluminum oxides that are insoluble in water. By converting such soluble components into insoluble derivatives, the present method avoids this problem that is traditionally associated with the reduction of nitrogen oxide-containing waste streams.

It will be apparent to those skilled in the art of removing NOx from waste feeds that many modifications and substitutions can be made to the preferred embodiments described above without departing from the spirit and scope of the present invention, which is defined by the appended claims.

What is claimed is:

1. A method for removing nitrogen oxide groups from waste material, said method comprising:
   providing a waste material comprising a nongaseous waste containing nitrogen oxide groups;
   providing a reaction vessel containing a fluidizable reaction bed and heating said reaction bed to an operating temperature;
   providing a fluidizing gas, at least one reductant and said waste material in said reaction bed wherein said fluidizing gas provides a gas velocity that agitates said waste material, fluidizes said reaction bed and elutriates fine solids from said fluidized reaction bed, wherein said fluidizing gas is provided in said fluidizable reaction bed via a fluidizing inlet, and wherein said waste material is provided in said fluidized reaction bed via a waste inlet;
   operating a first zone of said fluidized reaction bed under oxidizing conditions; and,
   operating a second zone of said fluidized reaction bed under reducing conditions so that said nitrogen oxide groups in said waste material are reduced at said operating temperature, thereby removing nitrogen oxide groups from said waste material and producing an inorganic residue and a gaseous effluent that together have substantially less nitrogen oxide groups than were present in said waste material.

2. The method as recited in claim 1, wherein said reaction bed comprises an upper zone and a lower zone and said method further comprises co-introducing oxygen and steam into said lower zone and said upper zone such that said lower zone and said upper zone operate under oxidizing conditions.

3. The method as recited in claim 1, wherein said reaction bed comprises an upper zone and a lower zone and said method further comprises co-introducing oxygen and steam into said lower zone such that said lower zone operates under oxidizing conditions.

4. The method as recited in claim 1, wherein said reaction bed comprises an upper zone and a lower zone and said method further comprises co-introducing oxygen and steam into said upper zone such that said upper zone operates under said oxidizing conditions.

5. The method as recited in claim 1, further comprising providing oxygen through said fluidizing inlet such that said first bed zone operates under said oxidizing conditions, and wherein said waste material is provided in said second bed zone through said waste inlet.

6. The method as recited in claim 1, wherein said reaction bed has a first zone corresponding to a first inlet into said vessel, a second zone corresponding to a second inlet into said vessel, and a third zone corresponding to a third inlet into said vessel, and wherein at least said second bed zone is operated under reducing conditions.

7. The method as recited in claims 6, wherein said second bed zone is above said first bed zone and said third bed zone is above said second bed zone.

8. The method as recited in claim 6, wherein said second bed zone is between said first and third bed zones.

9. The method as recited in claim 6, further comprising providing oxygen through said first inlet and through said third inlet such that said first and third bed zones operate under oxidizing conditions, and wherein said second inlet comprises said waste inlet and said waste material is provided in said second bed zone through said waste inlet.

10. The method as recited in claim 6, further comprising providing oxygen through said third inlet such that said third bed zone operates under oxidizing conditions, and wherein said second inlet comprises said waste inlet and said waste material is provided in said second bed zone through said waste inlet.

11. The method as recited in claim 6, further comprising providing oxygen through said first inlet such that said first bed zone operates under oxidizing conditions, and wherein said second inlet comprises said waste inlet and said waste material is provided in said second bed zone through said waste inlet.

12. The method as recited in claim 1, wherein said waste material contains water and steam is provided in said reaction bed by evaporating said water.

13. The method as recited in claim 1, wherein steam and carbon solids or other carbonaceous solids are provided in said reaction bed, and said carbonaceous solids react with said steam to provide said at least one reductant.

14. The method as recited in claim 13, wherein said carbonaceous solids comprise a charcoal or a sugar.

15. The method as recited in claim 1, wherein said waste material contains metal ions and said operating temperature is below a volatilization temperature of at least one of said metal ions, wherein a fluoride or chloride compound is provided in said reaction bed for converting said metal ions into a volatile metal fluoride or metal chloride, and wherein said operating temperature is above a volatilization temperature of said metal chloride or metal fluoride.

16. The method as recited in claim 1, wherein said waste material contains a non-volatile sulfur compound, wherein said reductant converts said non-volatile sulfur compound into a volatile sulfur compound, and wherein said operating temperature is above a volatilization temperature of said volatile sulfur compound.

17. The method as recited in claim 1, wherein said operating temperature is greater than 400° C.

18. The method as recited in claim 1, wherein said operating temperature is between 400° C. and 800° C.

19. The method as recited in claim 1, wherein steam provides said bed with heat energy, and wherein said method further comprises providing auxiliary heat energy to said bed to supplement said steam energy.

20. The method as recited in claim 1, wherein exothermic reduction reactions are used to reduce said nitrogen oxide groups and provide heat energy to said bed.

21. The method as recited in claim 1, wherein said waste material contains organics, and wherein said organics are oxidized in said reaction bed to form at least one of $CO$, $CO_2$ and $H_2O$.

22. The method as recited in claim 21, wherein heat energy is provided by introducing oxygen into said reaction bed to oxidize said organics.

23. The method as recited in claim 1, wherein said fluidizing gas is introduce into a first zone of said reaction bed, and wherein a second zone of said reaction bed is operated under reducing conditions and said waste material is introduced into said second zone.

24. The method as recited in claim 1, wherein said fluidizing gas comprises superheated steam, an oxidizing gas, a waste gas, a reducing gas or a mixture of two or more of steam, oxidizing gas, waste gas and reducing gas.

25. The method as recited in claim 1, wherein said fluidizing gas comprises steam and at least one other gas, the amount of said steam being sufficient to keep the total gas flow through the reaction bed at greater than 20% steam.

26. The method as recited in claim 1, wherein said at least one fluidizing gas comprises steam, carbon monoxide, carbon dioxide, hydrogen, oxygen, methane, ammonia, a gaseous compound with a nitrogen oxide group, a syn gas, a combustion gas, an inert gas or a mixture of steam and at least one other of said gases.

27. The method as recited in claim 1, wherein said at least one reductant comprises carbon monoxide, hydrogen, methane, ammonia, syn gas, or a mixture of two or more of said reductants.

28. The method as recited in claim 1, wherein at least one co-reactant is provided in said reaction vessel to enhance the reduction of said nitrogen oxides.

29. The method as recited in claim 28, wherein said co-reactant comprises a solid carbonaceous material, a soluble carbonaceous material, or iron, nickel, cooper, cobalt or a compound of said elements.

30. The method as recited in claim 29, wherein said carbonaceous material comprises a charcoal or a sugar.

31. The method as recited in claim 28, wherein said co-reactant is an iron or nickel oxalate, oxide or nitrate.

32. The method as recited in claim 28, wherein said co-reactant is an iron oxide and the amount of iron oxide provided in said reaction vessel is about 5 to 10% of the reaction bed medium.

33. The method as recited in claim 1, further comprising introducing at least one additive into said reaction vessel.

34. The method as recited in claim 33, wherein said additive comprises at least one oxidant provided in said reaction bed.

35. The method as recited in claim 34, wherein said oxidant comprises oxygen or hydrogen peroxide.

36. The method as recited in claim 33, wherein said additive forms with an element of a compound in said waste material a water-insoluble compound or a salt having a higher melting point than said compound in said waste material.

37. The method as recited in claim 33, wherein said waste material contains a compound of an alkaline earth element, and wherein said at least one additive is a compound of aluminum or phosphorous that forms with said alkaline earth element a salt having a higher melting point than said compound of an alkaline earth element.

38. The method as recited in claim 33, wherein said waste material contains a water soluble compound of sodium, and wherein said at least one additive is a compound of aluminum that forms a water insoluble oxide with said sodium.

39. The method as recited in claim 1, wherein said reaction bed comprises particles of inert material.

40. The method as recited in claim 39, wherein said reaction bed is comprised of inert beads.

41. The method as recited in claim 40, wherein said inert beads comprise amorphous alumina beads.

42. The method as recited in claim 40, wherein said inert beads have a diameter of at least about 200 microns.

43. The method as recited in claim 40, wherein said inert beads have a diameter of approximately 200 to 3000 microns.

44. The method as recited in claim 1, wherein said fluidizing gas provides an average reaction bed gas velocity of at least 1.0 feet per second.

45. The method as recited in claim 1 further comprising agitating said waste material in said reaction bed with superheated steam to speed reduction of said nitrogen oxide groups.

46. The method as recited in claim 1 further comprising using a gas distributor for said fluidizing gas wherein the orifice velocity of said gas distributor is sufficient to facilitate agglomeration break-up and self-cleaning of said reaction bed.

47. The method as recited in claim 46, wherein said orifice velocity is greater than 300 feet per second.

48. The method as recited in claim 1, wherein said waste material comprises an off-gas containing nitrogen oxides from a vitrification process or a thermal denitration process.

49. The method as recited in claim 1, wherein a portion of said reaction vessel contains solids larger than solids in another portion of said vessel, wherein said larger solids are washed to dissolve soluble salts and agglomerates, and wherein said larger solids are removed from said reaction vessel before or after said washing step.

50. A method for removing nitrogen oxide groups from waste material, said method comprising:
    providing a waste material comprising a nongaseous waste containing nitrogen oxide groups;
    providing a reaction vessel containing a fluidizable reaction bed and heating said reaction bed to an operating temperature;
    providing a fluidizing gas and said waste material in said reaction bed wherein said fluidizing gas provides a gas velocity that agitates said waste material, fluidizes said reaction bed and elutriates fine solids from said fluidized reaction bed, wherein said fluidizing gas is provided in said fluidizable reaction bed via a fluidizing inlet, and wherein said waste material is provided in said fluidized reaction bed via a waste inlet;
    operating a first zone of said fluidized reaction bed under oxidizing conditions; and,
    operating a second zone of said reaction bed under reducing conditions so that said nitrogen oxide groups in said waste material are reduced at said operating temperature, thereby removing nitrogen oxide groups from said waste material and producing an inorganic residue and a gaseous effluent that together have substantially less nitrogen oxide groups than were present in said waste material.

51. The method as recited in claim 50, wherein said fluidizing gas comprises steam and a reductant is provided in said reaction bed, wherein said reaction bed has a first zone, a second zone and a third zone, and wherein said second zone is operated under reducing conditions.

52. The method as recited in claim 51, further comprising the step of introducing oxygen into said first zone and said third zone such that said first zone and said third zone operate under oxidizing conditions.

53. The method as recited in claim 51, further comprising the step of introducing oxygen into said third zone such that said third zone operates under oxidizing conditions.

54. The method as recited in claim 51, further comprising the step of introducing oxygen into said first zone such that said first zone is operates under oxidizating conditions.

55. The method as recited in claim 51, further comprising the step of mixing oxygen with said steam and introducing said oxygen and said steam into said first zone and said third zone such that said first zone and said third zone operate under oxidizing conditions.

56. The method as recited in claim 51, further comprising the step of mixing oxygen with said steam and introducing said oxygen and said steam into said third zone such that said third zone operates under oxidizing conditions.

57. The method as recited in claim 51, further comprising the step of mixing oxygen with said steam and introducing said oxygen and said steam into said first zone such that said first zone operates under oxidizing conditions.

58. The method as recited in claim 50, further comprising providing an oxygen and steam mixture through said fluidizing inlet such that said first bed zone operates under oxidizing conditions, and wherein said waste material is provided in said second bed zone operated under reducing conditions.

59. The method as recited in claim 50, wherein said reaction bed has a first zone, a second zone, and a third zone, and wherein at least said second bed zone is operated under reducing conditions.

60. The method as recited in claims 59, wherein said second bed zone is above said first bed zone and said third bed zone is above said second bed zone.

61. The method as recited in claim 59, wherein said second bed zone is between said first and third bed zones.

62. The method as recited in claim 59, wherein said first and third bed zones operate under oxidizing conditions, and wherein said waste material is provided in said second bed zone.

63. The method as recited in claim 59, wherein said third bed zone operates under oxidizing conditions.

64. The method as recited in claim 59, further comprising providing an oxygen and steam mixture in said first zone and oxygen in said third zone such that said first bed zone and said third bed zone operate under oxidizing conditions.

65. The method as recited in claim 59, further comprising providing an oxygen and steam mixture in said third zone such that said third bed zone operates under oxidizing conditions.

66. The method as recited in claim 59, further comprising providing an oxygen and steam mixture in said first zone such that said first bed zone operates under oxidizing conditions.

67. The method as recited in claim 50, wherein said fluidizing gas comprises steam, and wherein said waste material contains water and at least a portion of said steam is provided by evaporating said water.

68. The method as recited in claim 50, wherein said fluidizing gas comprises steam, wherein carbon solids or other carbonaceous solids are provided in said reaction bed, and wherein said carbonaceous solids react with said steam to provide at least one reductant.

69. The method as recited in claim 68, wherein said carbonaceous material comprises a charcoal or a sugar.

70. The method as recited in claim 50, wherein said waste material contains metal ions and said operating temperature is below a volatilization temperature of at least one of said metal ions, wherein a fluoride or chloride compound is provided in said reaction bed for converting said metal ions into a volatile metal fluoride or metal chloride, and wherein said operating temperature is above a volatilization temperature of said metal chloride or metal fluoride.

71. The method as recited in claim 50, wherein said waste material contains a non-volatile sulfur compound, wherein an additive is introduced into said reaction vessel to convert said non-volatile sulfur compound into a volatile sulfur compound, and wherein said operating temperature is above a volatilization temperature of said volatile sulfur compound.

72. The method as recited in claim 50, wherein said operating temperature is greater than 400° C.

73. The method as recited in claim 50, wherein said operating temperature is between 400° C. and 800° C.

74. The method as recited in claim 50, wherein said fluidizing gas comprises steam, wherein said steam provides said bed with heat energy, and wherein said method further comprises providing auxiliary heat energy to said bed to supplement said steam energy.

75. The method as recited in claim 50, wherein exothermic reduction reactions are used to reduce said nitrogen oxide groups and provide heat energy to said bed.

76. The method as recited in claim 50, wherein said waste material contains organics, and wherein said organics are oxidized to form at least one of CO, $CO_2$ and $H_2O$.

77. The method as recited in claim 76, wherein heat energy is provided by introducing oxygen into said reaction bed to oxidize said organics.

78. The method as recited in claim 50, wherein said fluidizing gas is introduce into said first zone of said reaction bed, and wherein said waste material is introduced into said second zone through said waste inlet.

79. The method as recited in claim 78, wherein said fluidizing gas comprises superheated steam, an oxidizing gas, a waste gas, a reducing gas or a mixture of two or more of steam, oxidizing gas, waste gas and reducing gas.

80. The method as recited in claim 78, wherein said fluidizing gas comprises steam and at least one other gas, the amount of said steam being sufficient to keep the total gas flow through the reaction bed at greater than 20% steam.

81. The method as recited in claim 78, wherein said fluidizing gas comprises steam, carbon monoxide, carbon dioxide, hydrogen, oxygen, methane, ammonia, a gaseous compound with a nitrogen oxide group, a syn gas, a combustion gas, an inert gas or a mixture of steam and at least one other of said gases.

82. The method as recited in claim 50, wherein at least one reductant is provided in said reaction vessel and said at least one reductant comprises carbon monoxide, hydrogen, methane, ammonia, syn gas, or a mixture of two or more of said reductants.

83. The method as recited in claim 50, wherein at least one co-reactant is provided in said reaction vessel to enhance the reduction of said nitrogen oxides.

84. The method as recited in claim 83, wherein said co-reactant comprises a solid carbonaceous material, a soluble carbonaceous material, or iron, nickel, copper, cobalt or a compound of said elements.

85. The method as recited in claim 84, wherein said carbonaceous material comprises a charcoal or a sugar.

86. The method as recited in claim 83, wherein said co-reactant is an iron or nickel oxalate, oxide or nitrate.

87. The method as recited in claim 83, wherein said co-reactant is an iron oxide and the amount of iron oxide provided in said reaction vessel is about 5 to 10% of the reaction bed medium.

88. The method as recited in claim 50, wherein at least one oxidant is provided in said reaction bed.

89. The method as recited in claim 88, wherein said oxidant comprises oxygen or hydrogen peroxide.

90. The method as recited in claim 50, wherein an additive is provided in said reaction vessel to form with an element of a compound in said waste material a water-insoluble compound or a salt having a higher melting point than said compound in said waste material.

91. The method as recited in claim 90, wherein said waste material contains a compound of an alkaline earth element, and wherein said additive is a compound of aluminum or phosphorous that forms with said alkaline earth element a salt having a higher melting point than said compound of an alkaline earth element.

92. The method as recited in claim 90, wherein said waste material contains a water soluble compound of sodium, and wherein said additive is a compound of aluminum that forms a water insoluble oxide with said sodium.

93. The method as recited in claim 50, wherein said reaction bed comprises particles of inert material.

94. The method as recited in claim 50, wherein said reaction bed comprises inert beads.

95. The method as recited in claim 94, wherein said inert beads comprise amorphous alumina beads.

96. The method as recited in claim 94, wherein said inert beads have a diameter of at least about 200 microns.

97. The method as recited in claim 94, wherein said inert beads have a diameter of approximately 200 to 3000 microns.

98. The method as recited in claim 50, wherein said fluidizing gas provides an average reaction bed gas velocity of at least 1.0 feet per second.

99. The method as recited in claim 50 further comprising agitating said waste material in said reaction bed with superheated steam to speed reduction of said nitrogen oxide groups.

100. The method as recited in claim 50 further comprising using a gas distributor for said fluidizing gas wherein an orifice velocity of said gas distributor is sufficient to facilitate agglomeration break-up and self-cleaning of said reaction bed.

101. The method as recited in claim 100, wherein said orifice velocity is greater than 300 feet per second.

102. The method as recited in claim 50, wherein said waste material comprises an off-gas containing nitrogen oxides from a vitrification process or a thermal denitration process.

103. The method as recited in claim 50, wherein a portion of said reaction vessel contains solids larger than solids in another portion of said vessel, wherein said larger solids are washed to dissolve soluble salts and agglomerates, and wherein said larger solids are removed from said reaction vessel before or after said washing step.

104. The method as recited in claim 50, wherein said waste material includes a solids feed, a liquid feed, a slurry feed of solids in liquid, or two or more of said nongaseous feeds.

105. The method as recited in claim 50, further comprising providing oxygen through said fluidizing inlet such that said first bed zone operates under said oxidizing conditions, and wherein said waste material is provided in said second bed zone through said waste inlet.

* * * * *

UNITED STATES PATENT AND TRADEMARK OFFICE
CERTIFICATE OF CORRECTION

PATENT NO. : 7,125,531 B1 Page 1 of 1
APPLICATION NO. : 10/111148
DATED : October 24, 2006
INVENTOR(S) : J. Bradley Mason It is certified that error appears in the above-identified patent and that said Letters Patent is hereby corrected as shown below:

Column 1, line 51, "about" should be changed to --above--

Column 6, line15 - The following words should be inserted after "facilitate NOx" -- reduction. Metal Additives are not always required but are useful in maximizing NOx--

Column 8, line 58, "introduce" should be changed to --introduced--

Column 10, line 56, "operates" should be changed to --operated--

Column 10, line 56, "oxidizating" should be changed to --oxidizing--

Column 12, line 14, "introduce" should be changed to --introduced--

Signed and Sealed this

Twenty-seventh Day of March, 2007

JON W. DUDAS
*Director of the United States Patent and Trademark Office*